US 6,748,756 B2

(12) United States Patent
Kadle et al.

(10) Patent No.: US 6,748,756 B2
(45) Date of Patent: Jun. 15, 2004

(54) HVAC SYSTEM WITH PERIODIC OVERRIDE OF EVAPORATOR CONTROL

(75) Inventors: Prasad Shripad Kadle, East Amherst, NY (US); James Allen Baker, Williamsville, NY (US); Mahmoud Ghodbane, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/465,093

(22) Filed: Jun. 19, 2003

(65) Prior Publication Data

US 2004/0003616 A1 Jan. 8, 2004

Related U.S. Application Data

(60) Provisional application No. 60/393,271, filed on Jul. 2, 2002.

(51) Int. Cl.$^7$ ................................................. F25B 49/02
(52) U.S. Cl. .......................... 62/228.5; 62/157; 62/226
(58) Field of Search ............................ 62/228.5, 228.1, 62/228.4, 231, 174, 157, 158, 229, 228.3, 196.1, 196.2, 196.3, 215, 226, 227

(56) References Cited

U.S. PATENT DOCUMENTS

| | | | | |
|---|---|---|---|---|
| 4,480,443 A | * | 11/1984 | Nishi et al. | .................... 62/231 |
| 5,027,612 A | * | 7/1991 | Terauchi | ..................... 62/228.5 |
| 5,946,939 A | | 9/1999 | Matsushima et al. | |
| 6,263,687 B1 | * | 7/2001 | Ban et al. | ................... 62/228.3 |
| 6,358,016 B1 | * | 3/2002 | Hidaka et al. | ............. 62/228.5 |
| 6,505,478 B1 | | 1/2003 | Cousineau et al. | |
| 6,625,997 B1 | | 9/2003 | Schultz | |

* cited by examiner

Primary Examiner—Harry B. Tanner
(74) Attorney, Agent, or Firm—Patrick M. Griffin

(57) ABSTRACT

An air conditioning system for a vehicle includes a controller for periodically increasing the stroke and output of the pistons in a variable stroke compressor for periodically reducing the amount of refrigerant resident in the evaporator. The controller includes a timer for establishing predetermined time periods between the momentary spikes of periodic increases of stroke. Normally, the stroke is spiked only when the compressor is operating at a low load condition.

8 Claims, 2 Drawing Sheets

HVAC SYSTEM WITH PERIODIC OVERRIDE OF EVAPORATOR CONTROL

RELATED APPLICATION

This application claims the priority of provisional application No. 60/393,271 filed Jul. 2, 2002.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Also, such systems utilize various valve arrangements for controlling flow through the system during operation and during shutdown and/or in response to a leak of refrigerant in the system. In addition, an accumulator/dehydrator is frequently disposed in the suction line for accumulating refrigerant.

Past experience and recent studies demonstrate that at low load conditions, when the variable displacement compressor is operating at part stroke, refrigerant is trapped in the low side of the system, particularly in the evaporator. Minimizing this resident refrigerant will allow the system to be ready for any unforeseen events. One of the ways of minimizing this resident refrigerant is to minimize the internal volume of the evaporator. This entails proper design of the evaporator for low flow conditions. Another key factor in this design is to have very little volume at the bottom of the evaporator. This is particularly true of the U-channel evaporator that has tanks only on one side. These tanks are always at the top of the evaporator preventing any pooling of liquid refrigerant at the bottom of the evaporator.

Despite the efforts of minimization of charge resident in the evaporator, under certain conditions with a variable compressor, some refrigerant that is not actively participating in the heat transfer process stays resident in the evaporator. The reason for this is that the system has excess refrigerant to handle transient conditions and loss of charge over time. At low loads, the compressor de-strokes to match the needs of the system. Thus, the pumping capacity is reduced and the velocities of the refrigerant fall within the system. If the velocity is not high enough within the evaporator to overcome the gravitational effect, the liquid refrigerant tends to pool at the bottom. This is especially true of evaporators that have tanks at the bottom. This liquid refrigerant has no "pull" from either the compressor or the evaporation process and thus stays resident in the evaporator.

SUMMARY OF THE INVENTION AND ADVANTAGES

The subject invention minimizes the pooling of refrigerant in the evaporator in an air conditioning system for a vehicle by periodically increasing the stroke and output of a variable stroke compressor for periodically reducing the amount of refrigerant resident in the evaporator.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
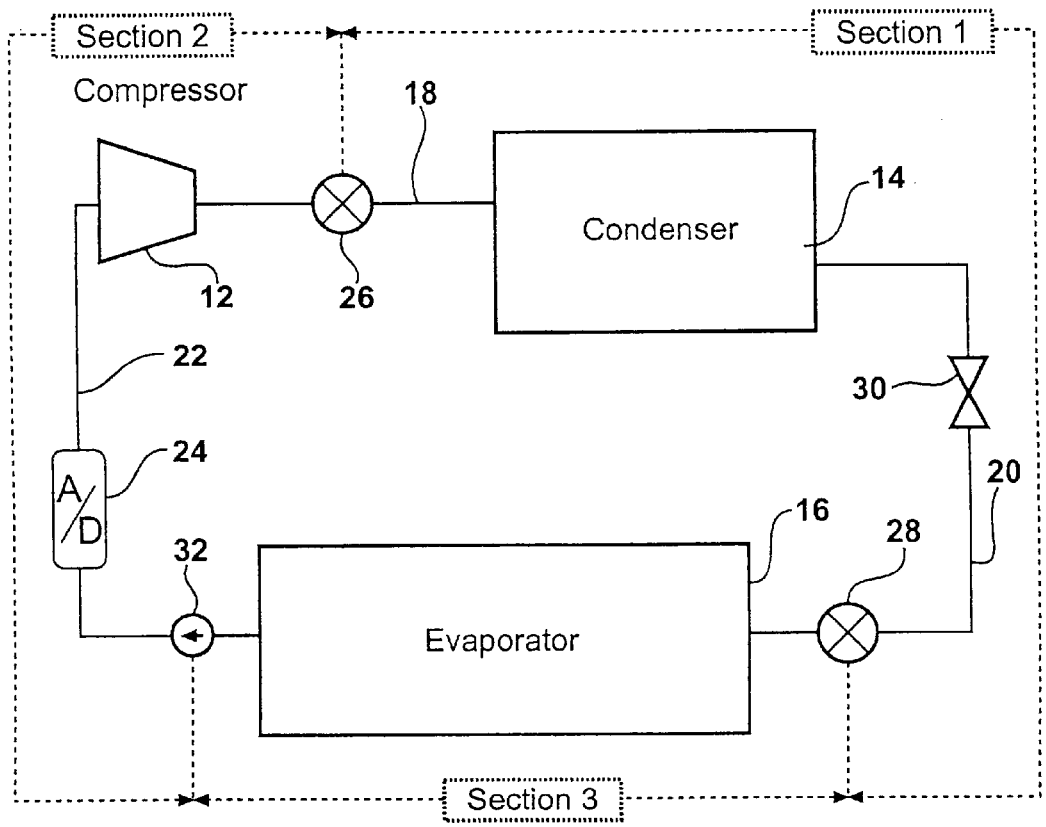
FIG. 1 is a schematic view of an air conditioning system employing the subject invention.

As alluded to above, the subject invention relates to an air conditioning system for a vehicle that comprises a compressor 12 for compressing a refrigerant, a condenser 14 for condensing the refrigerant, and an evaporator 16 for evaporating the refrigerant. Of course, a discharge fluid line 18 interconnects the compressor 12 and the condenser 14, while a liquid fluid line 20 interconnects the condenser 14 and the evaporator 16, and a suction fluid line 22 interconnects the evaporator 16 and the compressor 12 (it being appreciated that FIG. 1 is not proportional as it is schematic).

As is well known in the art, an accumulator/dehydrator (A/D) 24 is disposed in the suction fluid line 22 for accumulating refrigerant.

In addition, various valves are included for controlling the flow of refrigerant through the system. A first solenoid-operated valve 26 is moved between open and closed positions to control fluid flow in the suction fluid line 18 between the compressor 12 and the condenser 14. A second solenoid-operated valve 28 is moved between open and closed positions to control fluid flow in the liquid fluid line 20 between the condenser 14 and the evaporator 16. A thermal expansion device 30 is also disposed in the liquid fluid line 20 between the condenser 14 and the evaporator 16. A check valve 32 is disposed in the suction fluid line 22 between the evaporator 16 and the accumulator/dehydrator (A/D) 24. In this configuration, the expansion device is normally an orifice tube but generally could be replaced by any expansion device such as a capillary tube, TXV, etc. Of course, with the TXV, the A/D would be replaced by a receiver/dryer (R/D) that would be in the fluid line 20 between the condenser 14 and the expansion device 30.

These valves divide the system into three sections with section one extending between the first 26 and second 28 solenoid valves, section two extending between the check valve 32 and the first solenoid valve 26, and section three extending between the valves on either side of the evaporator 16, i.e., the second solenoid valve 28 and the check valve 32. Accordingly, section three consists primarily of the evaporator 16. This section three serves to isolate the evaporator 16 in the "off" mode. In general, the vehicle sits idle for very long periods of time. In case of a leak out of the evaporator 16, this minimal charge will be released into the passenger compartment but will not pose any safety hazard because of the low internal volume of section three. The check valve 32 is provided to allow the flow of refrigerant out of the evaporator 16 and into the A/D 24 when the system is shut down. The A/D 24 has high internal volume and typically holds the reserve charge in the system. This reserve charge allows the system to operate without any loss of performance in transient situations. The A/D 24 would be strategically placed such that its integrity would not be breached in most collisions (typically between the engine and the dash). The system is separated into several sections to mitigate the leaks out of the system in a collision or a leak caused by corrosion, etc.

Figure 3:
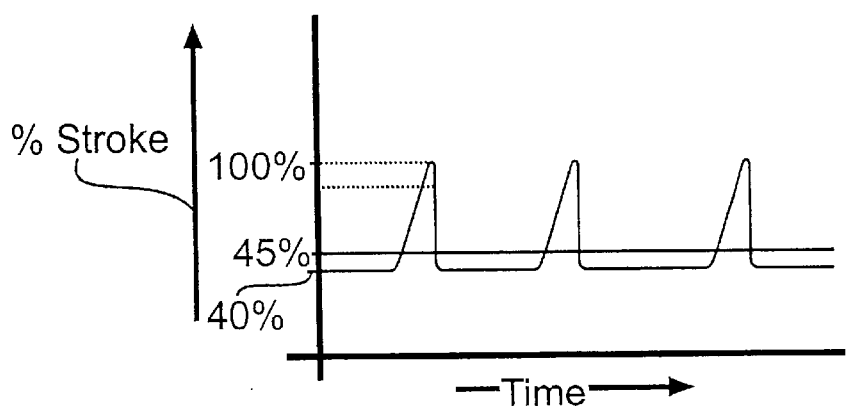
FIG. 3 is a curve plotting percentage of stroke against time and showing the periodic spikes of momentary increases in the length of stroke.

A number of mobile air conditioning are equipped with variable displacement compressors. The subject invention mitigates the pooling of refrigerant in the evaporator 16 by employing a compressor 12 having a variable stroke between a minimum and maximum stroke for compressing a refrigerant whereby the variable compressor periodically goes to a high stroke to allow the evaporator to be "emptied" out. This situation does not present itself in an air conditioning system with a fixed displacement compressor. A schematic of the change of stroke with time is shown in FIG. 3 wherein 40% is shown as the stroke that the system load demands. The subject method pushes the stroke up substantially, in this case to 100% to facilitate the "emptying" out of the evaporator. Of course, a value less than 100% could accomplish the same result. The system is then de-stroked to a lower value to enable the maintenance of comfort. Without the periodic and momentary increase in stroke, the stroke may have been at a higher percentage, for example 45%, to maintain comfort at that air-conditioning load.

Figure 2:
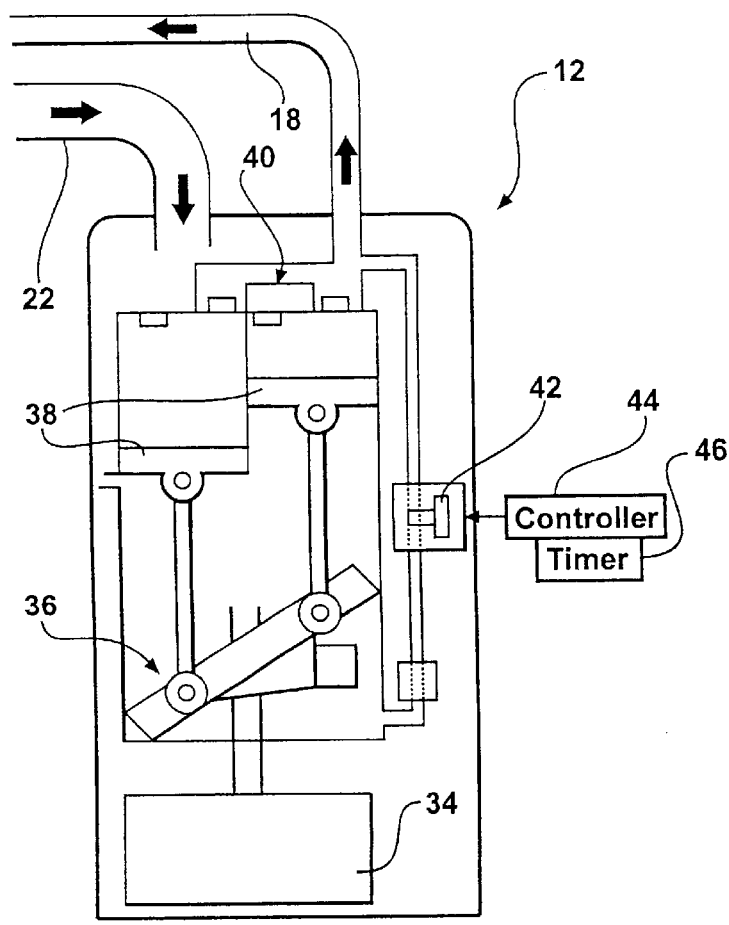
FIG. 2 is a schematic view of a compressor for implementing the subject invention.

This may be accomplished in an electronic variable stroke compressor 12 as illustrated in FIG. 2. An example of a compressor that could be used to implement the subject invention is described in U.S. Pat. No. 6,247,900 granted Jun. 19, 2001 to Archibald et al. Such a compressor 12 is well known in the art and includes an electric motor 34 for rotating a swash plate 36 to various angles to vary the stroke of a plurality of pistons 38. Various valves 40 control the flow into and out of the chambers surrounding the pistons 38 via the suction 22 and discharge 18 fluid lines. An electronic control valve 42 controls the angular position of the swash plate 36 to establish the length of stroke of the pistons 38.

The system includes a controller 44 for periodically increasing the stroke and output of the pistons 38 in the compressor 12 for periodically reducing the amount of refrigerant resident in the evaporator 16. The controller 44 includes a timer 46 for establishing predetermined time periods between the periodic increases of stroke. As illustrated in FIG. 3, the periodic increases are momentary spikes at regular intervals. Preferably, the controller 44 includes an activator for periodically increasing the stroke only when the compressor 12 is operating below a predetermined percentage of maximum stroke. In other words, the controller 44 would be operative to periodically increase the stroke only when the compressor 12 is operating at a low load condition. (It should be understood that the same controller and actuator may be used for other purposes such as improving energy usage, etc.)

In the preferred embodiment, the controller 44 and the electronic control valve 42 are electronic; however, the controller 44 control valve 42 may be pneumatic. In the pneumatic version of the compressor 12, the control valve 42 can be fooled into increasing the stroke by changing the pressure differential to the control valve 42. This would provide momentary upstrokes, thereby driving the refrigerant out, after which, the pressure differential is allowed to go back to the normal mode of operation allowing the compressor 12 to de-stroke.

This periodic emptying out of the evaporator at low loads keeps the resident refrigerant in the evaporator at a minimal level. Accordingly, the invention includes a method comprising the steps of periodically increasing the stroke and output of the compressor 12 for periodically reducing the amount of refrigerant resident in the evaporator 16. The method may be further defined as establishing predetermined time periods between the periodic increases of stroke and/or periodically increasing the stroke only when said compressor 12 is operating below a predetermined percentage of maximum stroke, e.g., a low load condition.

Obviously, many modifications and variations of the present invention are possible in light of the above teachings. The invention may be practiced otherwise than as specifically described within the scope of the appended claims.

What is claimed is:

1. An air conditioning system for a vehicle comprising:
    a compressor having a variable stroke between a minimum and maximum stroke for compressing a refrigerant,
    a condenser for condensing the refrigerant,
    an evaporator for evaporating the refrigerant,
    a discharge fluid line interconnecting the compressor and said condenser,
    a liquid fluid line interconnecting said condenser and said evaporator,
    a suction fluid line interconnecting said evaporator and said compressor,
    a controller for periodically increasing the stroke and output of said compressor for periodically reducing the amount of refrigerant resident in said evaporator.

2. A system as set forth in claim 1 wherein said controller includes a timer for establishing predetermined time periods between the periodic increases of stroke.

3. A system as set forth in claim 1 wherein said controller includes an activator for periodically increasing the stroke only when said compressor is operating below a predetermined percentage of maximum stroke.

4. A system as set forth in claim 1 wherein said controller is electronic.

5. A system as set forth in claim 1 wherein said controller is pneumatic.

6. A method of operating an air conditioning system of the type including a compressor having a variable stroke between a minimum and maximum stroke for compressing a refrigerant, a condenser for condensing the refrigerant, an evaporator for evaporating the refrigerant, a discharge fluid line interconnecting the compressor and the condenser, a liquid fluid line interconnecting the condenser and the evaporator, and a suction fluid line interconnecting the evaporator and the compressor, said method comprising the steps of periodically increasing the stroke and output of the compressor for periodically reducing the amount of refrigerant resident in the evaporator.

7. A method as set forth in claim 6 further defined as establishing predetermined time periods between the periodic increases of stroke.

8. A method as set forth in claim 6 further defined as periodically increasing the stroke only when said compressor is operating below a predetermined percentage of maximum stroke.

* * * * *